(12) United States Patent
Gooch (10) Patent No.: US 12,220,673 B2
(45) Date of Patent: Feb. 11, 2025

(54) PLANT CHEMICAL AND WATER MIXING AND DISPENSING APPARATUS

(71) Applicant: Robert K. Gooch, Simi Valley, CA (US)

(72) Inventor: Robert K. Gooch, Simi Valley, CA (US)

( * ) Notice: Subject to any disclaimer, the term of this patent is extended or adjusted under 35 U.S.C. 154(b) by 36 days.

(21) Appl. No.: 18/122,320

(22) Filed: Mar. 16, 2023

(65) Prior Publication Data

US 2024/0307902 A1  Sep. 19, 2024

(51) Int. Cl.
| | |
|---|---|
| B01F 25/316 | (2022.01) |
| A01C 23/04 | (2006.01) |
| B01F 21/20 | (2022.01) |
| B05B 7/04 | (2006.01) |

(52) U.S. Cl.
CPC .......... *B01F 25/316* (2022.01); *A01C 23/042* (2013.01); *B01F 21/22* (2022.01); *B05B 7/04* (2013.01); *Y10T 137/4891* (2015.04)

(58) Field of Classification Search
CPC .. B01F 25/316; B01F 21/22; Y10T 137/4891; B05B 7/04; A01C 23/042
See application file for complete search history.

(56) References Cited

U.S. PATENT DOCUMENTS

| | | | |
|---|---|---|---|
| 1,806,025 A | 5/1931 | Seaman | |
| 2,113,985 A | 4/1938 | Hettinger | |
| 3,726,304 A | 4/1973 | Cook | |
| 3,929,151 A | 12/1975 | Rubin | |
| 4,250,910 A | 2/1981 | King | |
| 4,846,403 A | 7/1989 | Mivelaz | |
| 4,898,402 A | 2/1990 | Craig | |
| 4,971,091 A | 11/1990 | Ho | |
| 5,010,912 A | 4/1991 | Riding | |
| 5,178,181 A | 1/1993 | Craig | |
| 5,666,987 A | 9/1997 | Combs | |
| 5,730,364 A | 3/1998 | Gertie | |
| 5,779,154 A | 7/1998 | Martin | |
| 5,806,769 A * | 9/1998 | Womack | A01G 25/02 248/83 |
| 5,823,430 A | 10/1998 | Clark, Jr. et al. | |
| 5,927,610 A | 7/1999 | Dutcher | |
| 6,173,732 B1 | 1/2001 | Davis et al. | |
| 6,680,026 B1 | 1/2004 | Denkewiez et al. | |
| 7,690,392 B1 | 4/2010 | Sarkiss | |
| 8,210,451 B1 | 7/2012 | Gooch et al. | |
| 8,409,434 B2 | 4/2013 | Andrews et al. | |
| 8,544,495 B1 * | 10/2013 | Weingart | A01C 23/042 422/264 |

* cited by examiner

*Primary Examiner* — Atif H Chaudry (57) ABSTRACT

A plant chemical and water mixing and dispensing apparatus (PCWMDA) comprising three major elements: a mixing chamber, a support member, and a pipe. All three elements are preferably integrally attached together and can made of various material including plastic, fiberglass or a composite to use the PCWMDA a person will place a second quantity of a plant chemical such as fertilizer, herbicide or bug killer into the mixing chamber. A water source provides water that is directed into a first end inlet on the pipe. The water flows upward through a first conduit into the mixing chamber. The water and chemical mix, and the mixture flows out of the mixing chamber via second conduit and back into the pipe. The water and chemical mixture then exits the pipe through a second end outlet, and is directed onto a desired area of plant-life.

20 Claims, 5 Drawing Sheets

PLANT CHEMICAL AND WATER MIXING AND DISPENSING APPARATUS

TECHNICAL FIELD

The invention generally pertains to plant/agriculture products, and more specifically to a plant chemical and water mixing and dispensing apparatus that allows a plant chemical and water to be mixed in a purpose-built chamber and then dispensed onto plant-life.

BACKGROUND ART

Many people throughout the world appreciate the appearance of healthy and attractive plant-life/vegetation. This is true for a homeowner who wants to have the best-looking lawn in the neighborhood to businessmen who desire plant life at their commercial or office buildings. As a result of this, much effort, time and expense are often need to ensure the best landscaping. Many individuals or business owners will hire professional gardeners or landscapers.

Unfortunately, it can be difficult to consistently maintain healthy and attractive plant-life. This is especially seen in locations where the climate is not optimal, or in areas with a large number of insects/bugs that feed off of or otherwise destroy plant-life. In order to combat these conditions it is typically necessary to utilize chemicals such as fertilizers and/or insecticides.

Maintaining healthy growth and appearance of various plants, such as vegetables, herbs, grass, shrubs, trees, lawns and flowers also require periodic watering. When fertilizer or insecticides are used in combination with the water, the health and the growth along with the appearance of the plants is greatly enhanced.

Fertilizer is typically comprised of a liquid, a powder or as a solid such as granules/pellets. Powdered fertilizer is often spread by hand or placed into a mechanical or electric spreader. Liquid fertilizer can be sprayed or placed into a container that is attached in-line with a watering hose. When water flows, the water stream causes a partial vacuum that forces the liquid fertilizer into the water stream. Fertilizer granules or pellets are typically applied by scattering them over an area surrounding plants. After the area is watered, the granules or pellets disintegrate, which in turn causes the chemical composition in the granules or pellets to seep into the soil. The granules or pellets can also be inserted into a container that is located in the path of a water stream, which causes the granules or pellets to disintegrate into the water stream. The use of granules or pellets has proven to be an economical convenient and safe method for fertilizing plants. Various designs of dispensers have been issued to dispensing water soluble chemicals. However, most prior art inventions are relatively complex, cumbersome to use and are not cost effective.

A search of the prior art did not disclose any literature or patents that read directly on the claims of the instant invention. However, the following U.S. patents are considered related:

| PAT. NO. | INVENTOR | ISSUED |
| --- | --- | --- |
| 6,561,437 | Schulman | May 13, 2003 |
| 6,827,292 | Kelly | Dec. 7, 2004 |
| 8,544,495 | Weingart, et al | Oct. 1, 2013 |
| 9,363,944 | Shaffer | Jun. 14, 2016 |

The U.S. Pat. No. 6,561,437 patent discloses a water and fertilizer dispenser that includes a hollow watering container forming aside cavity for holding a fertilizer container that fits into the side cavity and carries fertilizer to be mixed with water carried by the watering container. The fertilizer is a viscous aqueous composition that clings to the cap of the fertilizer container. Removable sprinkler head for the watering container is stored in a part of the watering container.

The U.S. Pat. No. 6,928,292 patent discloses a fertilizer dispenser with an inlet compartment and an outlet compartment, with an inlet into the top of the inlet compartment. The inlet is connected to an inlet sub-line directed into the inlet compartment and an outlet sub-line directed into the outlet compartment. An outlet is located in the bottom of the outlet of compartment. The inlet and outlet compartments are separated by a baffle which permits flow over the baffle from the inlet compartment to the outlet compartment. The fertilizer dispenser is used for watering with supply hoses connected in series with seep hoses located about the vegetation to be watered.

The U.S. Pat. No. 8,544,495 patent discloses a dispenser for liquid and/or solid chemicals consisting of a reservoir, an inlet line and an outlet line both connected into the reservoir. A saddle attaches to an external fluid supply line with the inlet lines interfacing with the reservoir. A press-in inlet nozzle is disposed in the fluid inlet line and enters upstream into the fluid supply line, and a press-in outlet nozzle is attached into the fluid outlet line. A saddle clamp attaches the saddle enclosing the external fluid supply line, such that when a fluid flows downstream through the fluid supply line the inlet nozzle receives a portion of the flow through velocity ram induction and is introduced into the reservoir where it mixes with liquid and/or solid chemicals. The solution is drawn from the reservoir with negative pressure created by the downstream facing outlet nozzle positioned within the flow stream, thereby permitting the solution to mix with the supply fluid in a controlled volume according to a selected nozzle configuration.

The U.S. Pat. No. 9,363,944 patent discloses a fertilizer dispenser that is used on a surface area and comprises a main body for storing fertilizer, a rolling mechanism affixed to the main body, and a control mechanism engaged with the main body. Tines extend radially from the rolling mechanism to enable a targeted site prior to fertilization. The fertilizer dispenser's apparatus rolls over the surface area to be treated. Then, a trigger mechanism is engaged and a metering auger drops a controlled amount of fertilizer. Once the fertilizer is dropped, the surface is treated via a back and forth motion of the rolling mechanism.

For background purposes and indicative of the art to which the invention relates, reference may be made to the following remaining patents found in the patent search.

| PAT. NO. | INVENTOR | ISSUED |
| --- | --- | --- |
| 1,806,025 | Seaman | May 19, 1931 |
| 2,113,985 | Hettinger | Apr. 12, 1938 |
| 3,726,304 | Cook | Apr. 19, 1973 |
| 3,929,151 | Rubin | Dec. 30, 1975 |
| 4,250,910 | King | Feb. 17, 1981 |
| 4,846,403 | Mivelaz | Jul. 11, 1989 |
| 4,898,202 | Craig | Feb. 6, 1990 |
| 4,971,091 | Ho | Nov. 20, 1990 |
| 5,010,912 | Riding | Apr. 30, 1991 |
| 5,178,181 | Craig | Jan. 12, 1993 |
| 5,666,987 | Combs | Sep. 16, 1997 |
| 5,730,364 | Gertie | Mar. 24, 1998 |
| 5,779,154 | Martin | Jul. 14, 1998 |

| PAT. NO. | INVENTOR | ISSUED |
| --- | --- | --- |
| 5,823,430 | Clark, Jr., et al | Oct. 20, 1998 |
| 5,927,610 | Dutcher | Jul. 27, 1999 |
| 6,173,732 | Davis, et al | Jan. 16, 2001 |
| 6,680,026 | Denkewicz, et al | Jan. 20, 2004 |
| 7,690,392 | Sarkiss | Apr. 6, 2010 |
| 8,210,451 | Gooch, et al | Jul. 3, 2012 |
| 8,409,434 | Andrews, et al | Apr. 2, 2013 |

DISCLOSURE OF THE INVENTION

A plant chemical and water mixing and dispensing apparatus (PCWMDA) that functions in combination with a water source to quickly and easily produce a mixture of a plant chemical and water which is applied onto plant life such as grass, bushes, trees, shrubs or edible/agricultural plants. The plant chemical can be any product that helps plants grow, assists with plant health and kills bugs and other unwanted pests that damage/harm a plant. The PCWMDA can use any type of fertilizer, herbicide, bug killer or plant growth supplement, either in solid form such as pellets or granules, powder or liquid form.

The PCWMDA is essentially comprised of three elements: a mixing chamber, a support member and a pipe. The mixing chamber has an opening into which a plant chemical is inserted. A water source is attached to one end of the pipe and water is directed through the pipe. From the pipe the water flows through a first conduit up into the mixing chamber, where the water mixes with the plant chemical within the chamber. The water and chemical mixture then flows out of the mixing chamber through a second conduit and back into the pipe. The water and chemical mixture then exits the pipe through an outlet, which is positioned to apply the water and chemical mixture onto a desired plant.

One of the main benefits of using the PCWMDA is that the apparatus itself is simply designed with no moving parts/mechanism that could break or malfunction. The PCWMDA utilizes the pressure of the water, as well as gravity to effectively send water into the mixing chamber, and to have the water and chemical mixture that is produced out of the mixing chamber and then into and out of the pipe.

The PCWMDA can be made of various materials such as plastic, fiberglass or a composite, and by various methods including a mold or 3-D printing. Although it is preferable to manufacture the mixing chamber, support member and pipe as an integral, unitary structure, it is also possible to assemble the three elements as separate pieces which can be attached together by use of an adhesive or similar product.

In view of the above disclosure, the primary object of the invention is to produce a plant chemical and water mixing and dispensing apparatus that allows water and a plant chemical to be quickly and easily mixed together in a specially designed chamber and then directed outward from the chamber into a pipe and then onto a selected plant or area of vegetation.

In addition to the primary object, it is also an object of the invention to produce a plant chemical and water mixing and dispensing apparatus that:

can be used for almost any type of plant-life,
does not require external or internal power,
is easy to learn and use,
is lightweight and is easily transported,
is robust and long-lasting,
is easy to clean and maintain,
can be sold/marketed as a stand-alone item or along with a plant chemical,
can be used by average individuals or professional gardeners/greenskeepers,
can be set-up and relied upon to operate correctly, without requiring constant monitoring, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment of a plant chemical and water mixing and dispensing apparatus (PCWMDA 10) which is also known as the ALF (Automatic Lawn Feeder). The PCWMDA 10 is designed to function in combination with a water source such as a utility residential or commercial water spigot, or a spigot and hose. The water source is connected to the PCWMDA 10 and water is directed into the PCWMDA 10. A selectable quantity of a plant chemical is placed into the PCWMDA 10. The plant chemical can consist of a fertilizer, a herbicide, a bug killer or a plant growth supplement, and be in the form of a solid such as pellets or granules, a powder or a liquid. The water and plant chemical mix together within the PCWMDA 10, and the mixture is then directed out of the PCWMDA 10 and onto a desired plant-life which can include grass/lawn, bushes, trees, shrubs or edible plants/vegetation.

The PCWMDA 10, as shown in FIGS. 1-8, is comprised of three major elements: a mixing chamber 12 which is preferably a circular mixing chamber 14, a support member 50, and a pipe 104. The mixing chamber, either 12 or 14, is comprised of an inner surface 16, an outer surface 18, an upper section 20, a lower section 22, a rear section 24, a front section 26, a first lower bore 28, a second lower bore 30, and an opening 32. The plant chemical is placed within the mixing chamber through the opening 32. Sealing means 34 maintain the opening closed. The sealing means 34 can comprise a simple stopper that is designed and dimensioned to press-fit into the opening 32. As shown in FIGS. 1-5, 7 and 8, the sealing means 34 is preferably comprised of a threaded flange 40 that extends outward along the perimeter of the opening 32 and a cap 42 with inner threads that correspond to the threads on the flange 40, thereby allowing the cap 42 to be screwed onto the flange which seals the opening 32. The cap 42 is easily removed by simply un-screwing the cap from the flange.

Figure 1:
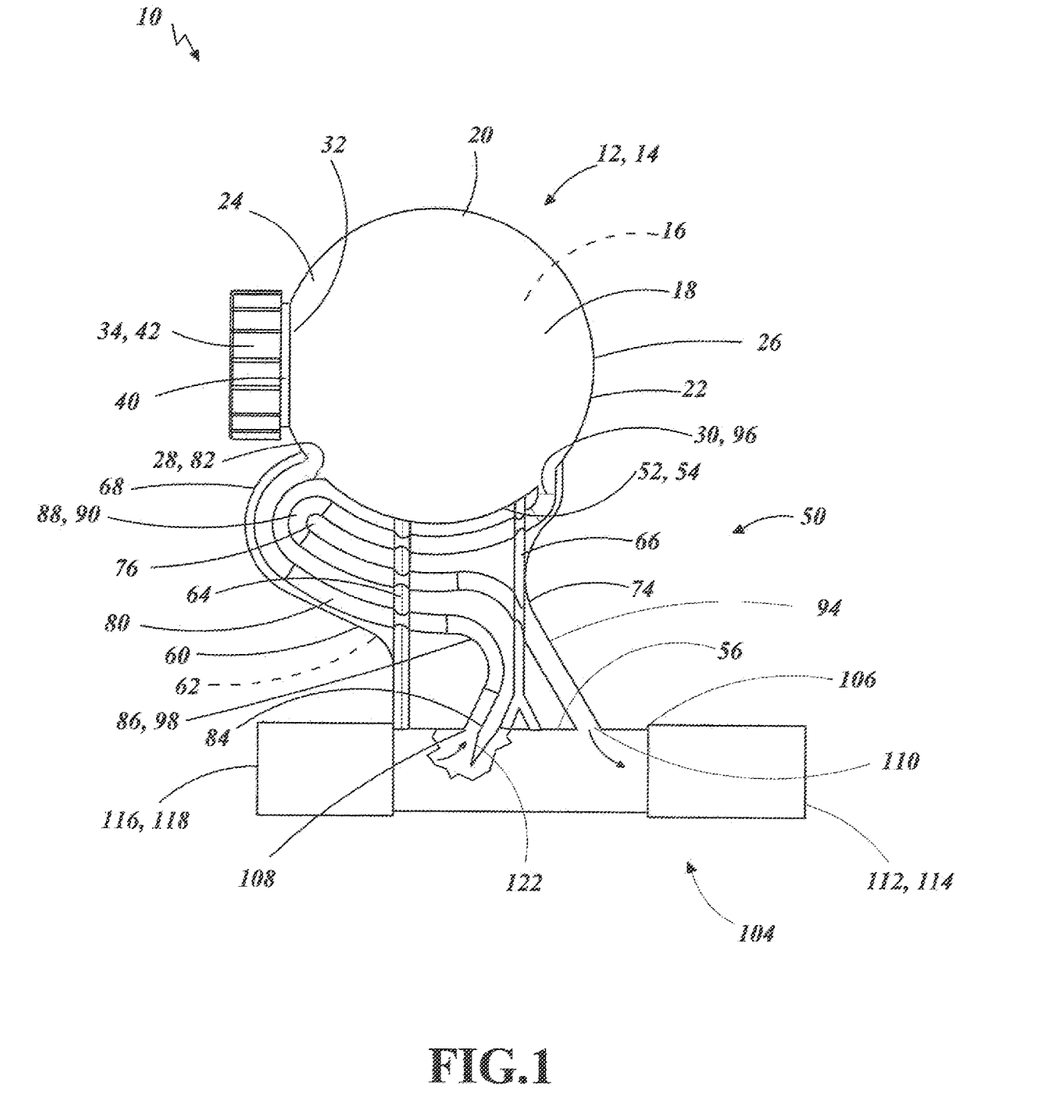
FIG. 1 is an elevational side view of a plant chemical and water mixing and dispensing apparatus (PCWMDA).
Figure 2:
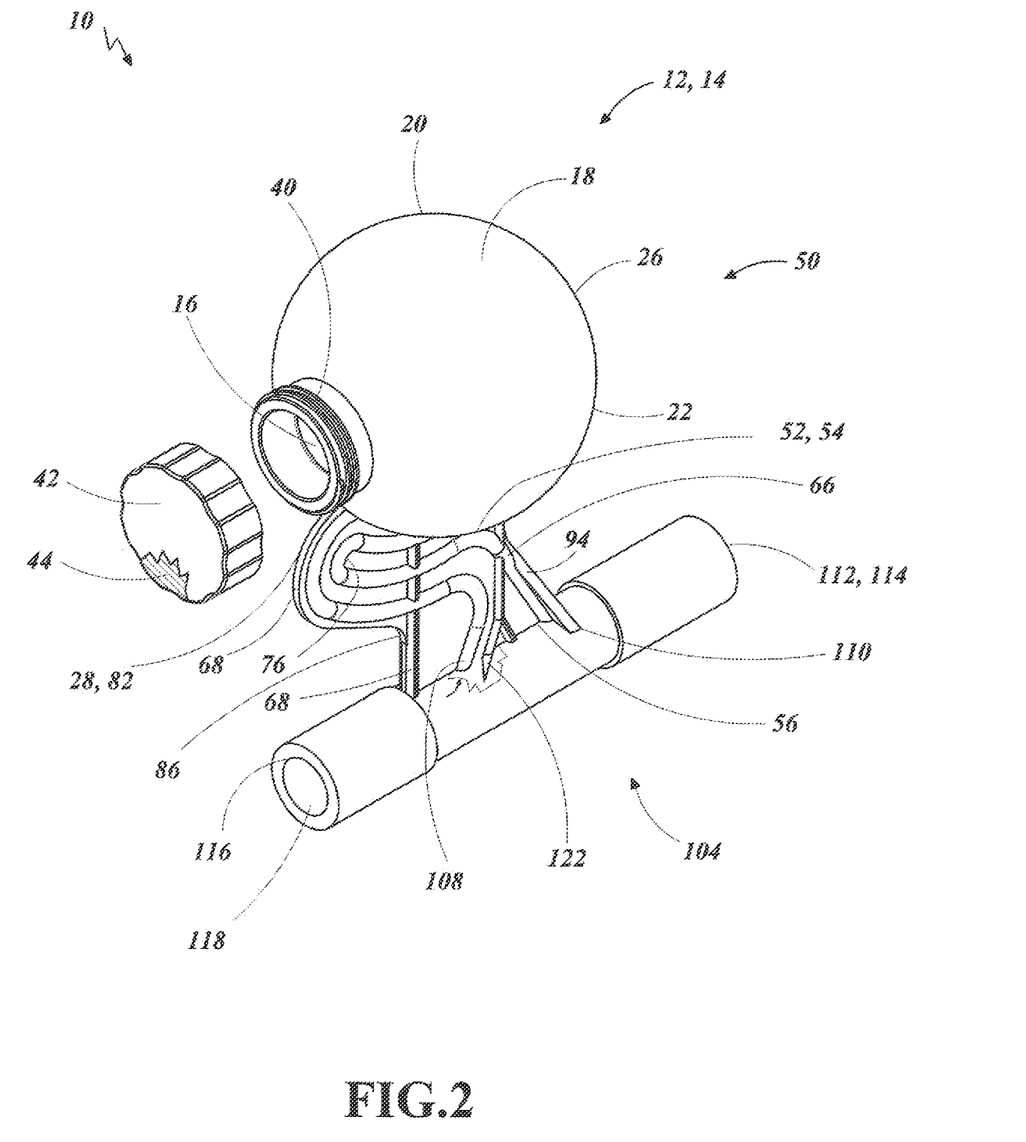
FIG. 2 is an orthographic front view of the PCWMDA showing a threaded cap removed from a threaded flange surrounding an opening on a mixing chamber.
Figure 3:
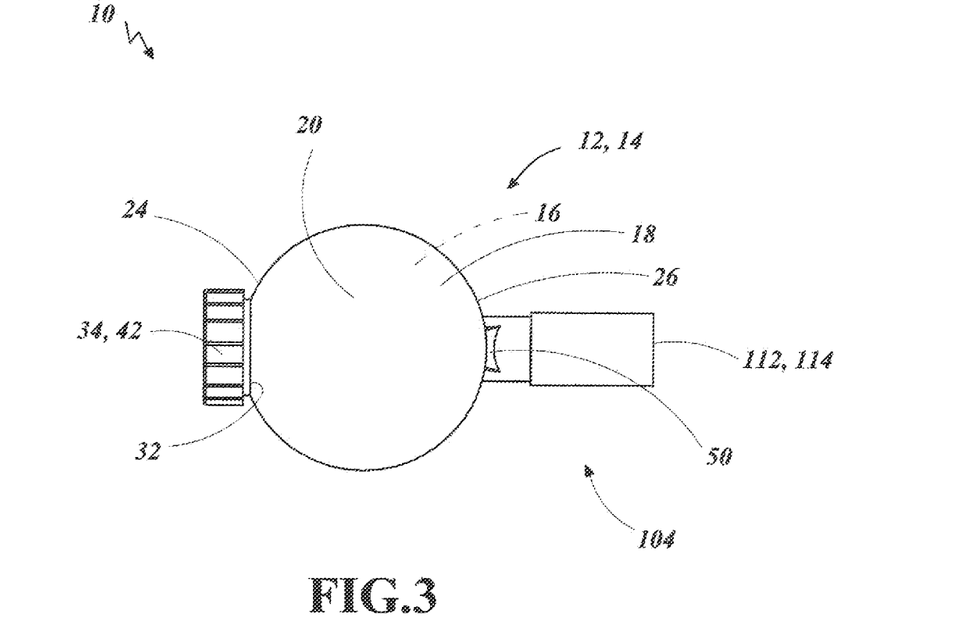
FIG. 3 is a top plan view of the PCWMDA.
Figure 4:
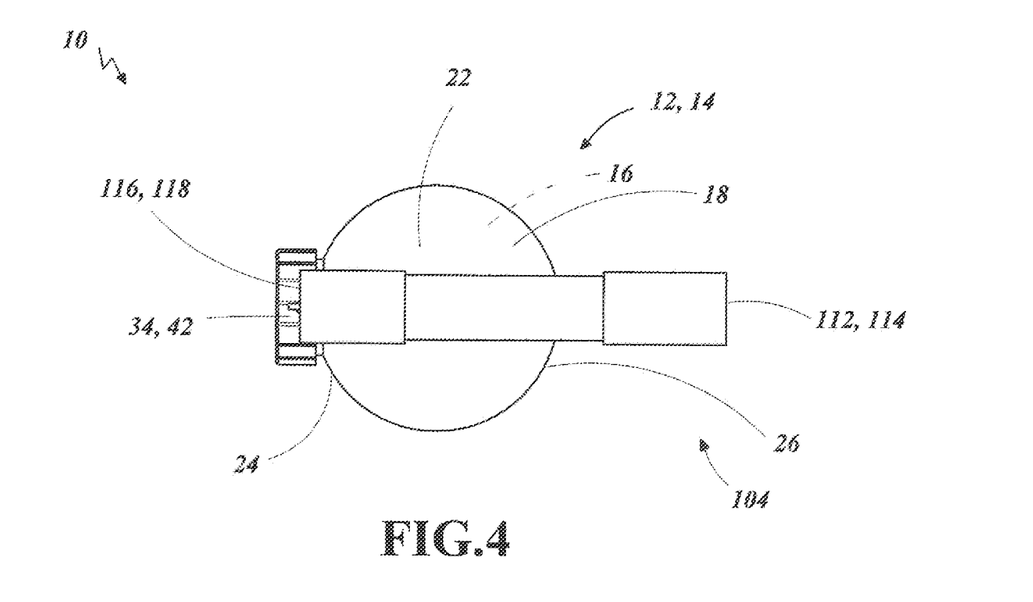
FIG. 4 is a bottom plan view of the PCWMDA.
Figure 5:
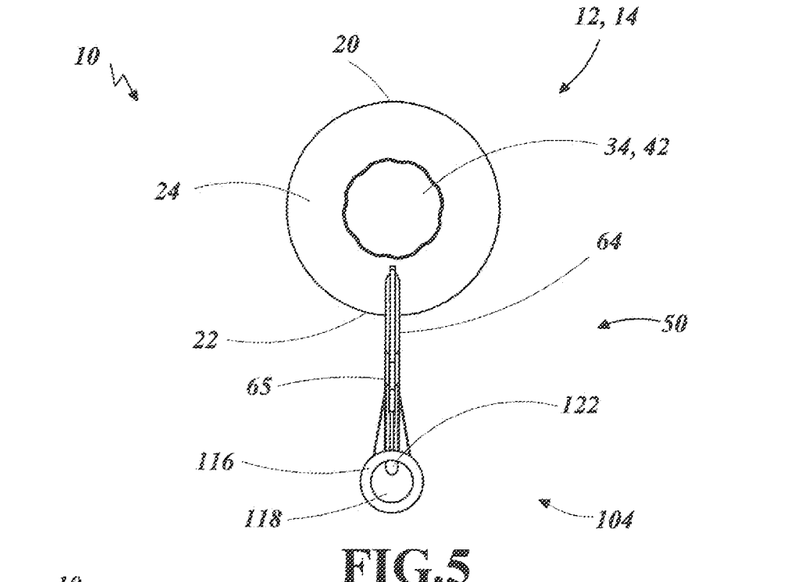
FIG. 5 is an elevational rear view of the PCWMDA.
Figure 6:
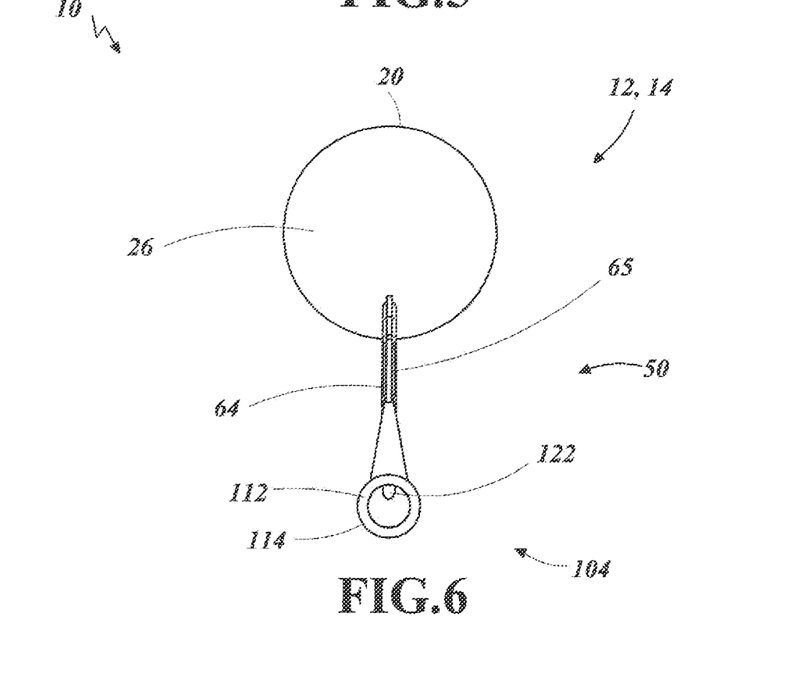
FIG. 6 is an elevational front view of the PCWMDA.
Figure 7:
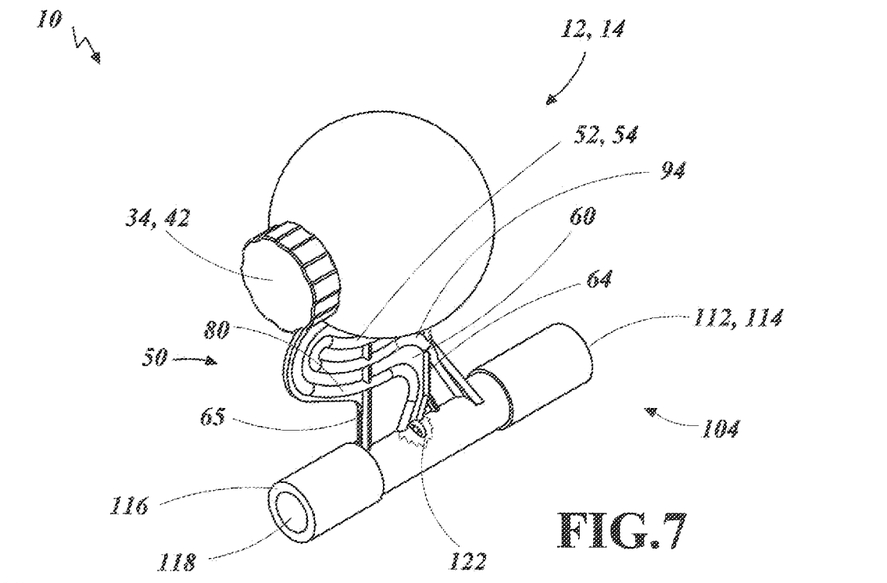
FIG. 7 is an orthographic rear view of the PCWMDA.
Figure 8:
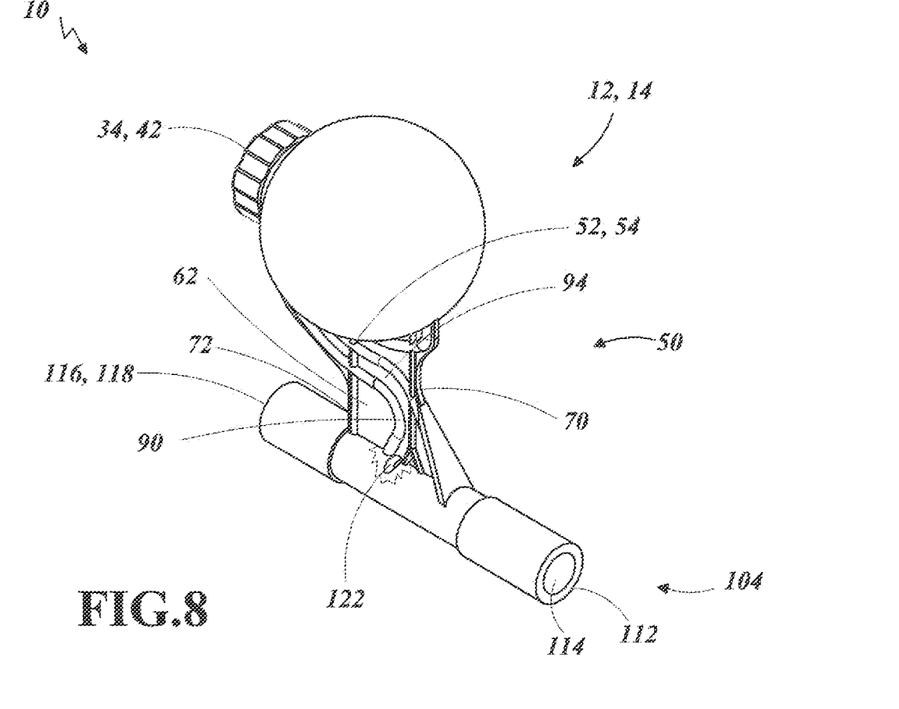
FIG. 8 is an orthographic front view of the PCWMDA

The support member 50, as shown in FIGS. 1, 2 and 5-8, has either a level upper edge 52, or, preferably a semi-circular upper edge 54. As shown in FIGS. 1 and 3, the semi-circular upper edge 54 is dimensioned such that the lower section 22 of the circular mixing chamber 14 fits into and is seated within the semi-circular edge 54. The support member 50 also comprises a lower edge 56, a first side surface 60, a second side surface 62, a rear edge 66 with an outward curve 68, a front edge 74 with an inward curve 76. A first side front vertical stabilizer 64 with a lower end that preferably branches downward in two equal arms, forming a triangular section, a first side rear vertical stabilizer 65, a second side front vertical stabilizer 70 that, like the first side front vertical stabilizer, preferably branches downward in two equal arms, forming a triangular section, and a second side rear vertical stabilizer 72. Located on/in the support member 50 are a first conduit 80 and a second conduit 94, as shown in FIGS. 1 and 7. The first conduit 80 has an upper end 82 that terminates at and interfaces with the first lower bore 28 on the mixing chamber, a lower end 84, a lower curved section 86, and upper curved section 88, and a U-shaped section 90. The second conduit 94 has an upper end 96 that terminates at and interfaces with the second lower bore 30 on the mixing chamber, a lower end 98, a lower curved section 100, and an upper curved section 102. The curved sections on the first conduit 80 and second conduit 94 are specifically designed and oriented to ensure that water that has entered the mixing chamber and the water and plant chemical mixture that is created remains within the mixing chamber. If the conduits were just straight it would be possible for the water/water and plant chemical mixture to flow downward through the lower bores, back into the conduits at undesired times.

The pipe 104, as shown in FIGS. 1-8, is comprised of an upper surface 106 having a first upper bore 108 where the lower end 84 of the first conduit 80 terminates, a second upper bore 110 where the lower end 98 of the second conduit 94 terminates, a first end 112 having an output 114, and a second end 116 having an inlet 118. Located near the substantial center of the pipe 104, at the upper surface 106, is an upper opening Additionally, located within the pipe 104 below the upper opening and first conduit 80 is an inner directing tab 122, as shown in FIGS. 1, 2 and 5-8, that forces water flowing through the pipe 104 from the inlet 118 to flow upward into and through the first conduit 80.

In order to use the PCWMDA 10 the following steps are performed: a plant chemical is inserted into the mixing chamber via the opening and the opening is then sealed. Water from a water source is directed into the pipe's second end inlet. The water then flows upward onto and along the inner directing tab and then through the first conduit into the mixing chamber. The water and plant chemical mix and the mixture exits downward the second conduit into the pipe and then out the pipe's first end outlet. The PCWMDA is positioned such that the water and plant chemical mixture is directed onto a desired plant life.

In order to increase the functionality of the PCWMDA 10, a light can be added. The light, which preferably is battery (or solar) powered would be permanently or non-permanently attached onto the PCWMDA. Once the PCWMDA is placed at an operating location the light could be turned on. The light will increase the visibility of the PCWMDA especially at night or in low light environments. This can lower the chance that the PCWMDA is inadvertently stepped on, tripped over or otherwise damaged from contact by another object such as a lawnmower or even a vehicle. Also, a clamp device could be added to the PCWMDA 10. The clamp will preferably be located at a lower area of the pipe and would allow the PCWMDA to be secured onto another elevated or non-elevated structure.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A plant chemical and water mixing and dispensing apparatus (PCWMDA) comprising:
    a mixing chamber having:
        a an inner surface;
        an outer surface;
        an upper section;
        a lower section;
        a rear section;
        a front section;
        a first lower bore;
        a second lower bore;
        an opening;
        opening sealing means;
    a support member having:
        an upper edge;
        a lower edge;
        a first side surface;
        a second side surface;
        a rear edge comprising an outward curve;
        a front edge comprising an inward curve;
        a front vertical stabilizer extending from the mixing chamber on a first end and configured to terminate on a pipe on a second opposite end, the second end branching into two equal arms, forming a first triangular section;
        a rear vertical stabilizer extending from the mixing chamber on a first end and configured to terminate on the pipe on a second opposite end, the second end branching into two equal arms, forming a second triangular section;
    a first conduit comprised of:
        an upper end that interfaces with the first lower bore;
        a lower end;
        a lower curved section;
        an upper curved section;
        a U-shaped section;
    a second conduit comprised of:
        an upper end that interfaces with the second lower bore;
        a lower end;
        a lower curved section;
        an upper curved section; and
    a pipe comprising:
        an upper surface with a first upper bore and a second upper bore;
        a first end having an outlet; and
        a second end having an inlet, with a plant chemical inserted into the mixing chamber via the opening, and water from a water source directed into the pipe second end inlet, up through the first conduit into the mixing chamber, the water and chemical mix and the mixture exits downward through the second conduit into the pipe and out the pipe first end outlet.

2. The plant chemical and water mixing and dispensing apparatus of claim 1, wherein the PCWMDA is made of plastic.

3. The plant chemical and water mixing and dispensing apparatus of claim 1, wherein the PCWMDA is made of fiberglass.

4. The plant chemical and water mixing and dispensing apparatus of claim 1, wherein the PCWMDA is made of a composite material.

5. The plant chemical and water mixing and dispensing apparatus of claim 1, wherein the mixing chamber, the support member and the pipe are integrally molded.

6. The plant chemical and water mixing and dispensing apparatus of claim 1, wherein the mixing chamber, the support member and the pipe are integrally made by 3-D printing.

7. The plant chemical and water mixing and dispensing apparatus of claim 1, wherein the plant chemical is selected from the group consisting of a fertilizer, a herbicide, a bug killer and a plant growth supplement.

8. The plant chemical and water mixing and dispensing apparatus of claim 1, wherein the water is provided by a water spigot or spigot and hose combination.

9. The plant chemical and water mixing and dispensing apparatus of claim 1, wherein the opening scaling means is comprised of a stopper that is dimensioned to press-fit into the opening.

10. The plant chemical and water mixing and dispensing apparatus of claim 1, wherein the support member further comprises a cut-out located adjacent the support member lower edge.

11. A plant chemical and water mixing and dispensing apparatus (PCWMDA) comprising:
a circular mixing chamber having:
an inner surface;
an outer surface;
an upper section;
a lower section;
a rear section;
a front section;
a first lower bore;
a second lower bore;
an opening having a threaded flange;
a cap having inner threads that correspond to the threads on the threaded flange;
a support member having:
a semi-circular upper edge that corresponds to the circular shape of the mixing chamber lower section;
a lower edge;
a first side surface;
a second side surface;
a rear edge comprising an outward curve and a structural stabilizer;
a front edge comprising an inward curve;
a front vertical stabilizer extending from the mixing chamber on a first end and configured to terminate on a pipe on a second opposite end, the second end branching into two equal arms, forming a first triangular section;
a rear vertical stabilizer extending from the mixing chamber on a first end and configured to terminate on the pipe on a second opposite end, the second end branching into two equal arms, forming a second triangular section;
a first conduit comprised of:
an upper end that interfaces with the first lower bore;
a lower end;
a lower curved section;
an upper curved section;
a U-shaped section,
a second conduit comprised of:
an upper end that interfaces with the second lower bore;
a lower end;
a lower curved section;
an upper curved section;
a cut-out located adjacent the support member lower edge, and behind the front edge;
a pipe comprising:
an upper surface with a first upper borer and a second upper bore;
a first end having an outlet; and
a second end having an inlet, with a plant chemical inserted into the mixing chamber via the opening, and water from a water source directed into the pipe second end inlet, up through the first conduit into the mixing chamber, the water and chemical mix and the mixture exits downward through the second conduit into the pipe and out the pipe first end outlet.

12. The plant chemical and water mixing and dispensing apparatus of claim 11, wherein the PCWMDA is made of plastic.

13. The plant chemical and water mixing and dispensing apparatus of claim 11, wherein the PCWMDA is made of fiberglass.

14. The plant chemical and water mixing and dispensing apparatus of claim 11, wherein the PCWMDA is made of a composite material.

15. The plant chemical and water mixing and dispensing apparatus of claim 11, wherein the mixing chamber, the support member and the pipe are integrally molded.

16. The plant chemical and water mixing and dispensing apparatus of claim 11, wherein the mixing chamber, the support member and the pipe are integrally made by 3-D printing.

17. The plant chemical and water mixing and dispensing apparatus of claim 11, wherein the plant chemical is selected from the group consisting of a fertilizer, a herbicide, a bug killer and a plant growth supplement.

18. The plant chemical and water mixing and dispensing apparatus of claim 11, wherein the water is provided by a water spigot or spigot and hose combination.

19. A plant chemical and water mixing and dispensing apparatus (PCWMDA) comprising:
a mixing chamber with a first lower bore and a second lower bore;
a support member having:
a rear edge comprising an outward curve;
a front edge comprising an inward curve;
a front vertical stabilizer extending from the mixing chamber on a first end and configured to terminate on a pipe on a second opposite end, the second end branching into two equal arms, forming a first triangular section;
a rear vertical stabilizer extending from the mixing chamber on a first end and configured to terminate on the pipe on a second opposite end, the second end branching into two equal arms, forming a second triangular section;
a first conduit comprised of:
an upper end that interfaces with the first lower bore;
a lower end;
a lower curved section;
an upper curved section;
a U-shaped section; and
a second conduit comprised of:
an upper end that interfaces with the second lower bore;
a lower end;

a lower curved section;

an upper curved section;

the mixing chamber configured to receive a plant chemical and water from a water source, the water received up through the first conduit into the mixing chamber, where the water and chemical mix, and the water/chemical mixture exits downward through the second conduit.

20. The plant chemical and water mixing and dispensing apparatus of claim 19, further comprising a pipe that supplies the water source through a first end and emits the water/chemical mixture through a second end.

\* \* \* \* \*